United States Patent

[11] 3,596,228

[72] Inventors Frank W. Reed, Jr.
 Jeffersonville;
 William J. Ryan, Jericho, both of, Vt.
[21] Appl. No. 828,905
[22] Filed May 29, 1969
[45] Patented July 27, 1971
[73] Assignee International Business Machines
 Corporation
 Armonk, N.Y.

[54] FLUID ACTUATED CONTACTOR
 12 Claims, 6 Drawing Figs.
[52] U.S. Cl. ...................................................... 339/59,
 339/117, 339/174
[51] Int. Cl. ...................................................... H01r 13/48
[50] Field of Search ........................................... 339/59,
 174, 117, 17; 324/158

[56] References Cited
UNITED STATES PATENTS
3,401,369 9/1968 Palmateer et al. ............. 339/143 X
3,405,361 10/1968 Kattner et al. ................. 324/158

OTHER REFERENCES
 IBM Technical Disclosure Bulletin titled " Interconnection Devices" by J. F. Smith vol. 9 No. 2 July 1966 pages 152-154 339-117 P Primary Examiner—Richard E. Moore
Attorneys—Hanifin and Jancin and Willis E. Higgins ABSTRACT: A constant impedance or impedance matched fluid actuated contactor for electrical components, especially integrated circuit semiconductor chips, is provided. The contactor has a flexible dielectric membrane, on one side of which is a resilient, electrically conductive ground plane. On the other side of the dielectric membrane is a plurality of electrically conductive lines adapted to contact the electrical component. The membrane is mounted on a pressure chamber, and a pressurized fluid is utilized to move the dielectric membrane and the electrically conductive lines carried thereon into contacting engagement with the electrical component.

PATENTED JUL 27 1971

INVENTORS
FRANK W. REED, JR.
WILLIAM J. RYAN

BY *Willis E. Higgins*

ATTORNEY 3,596,228

FLUID ACTUATED CONTACTOR

Field of the Invention

This invention relates to a fluid actuated contactor for electrical components. More particularly, it relates to an impedance matched or constant impedance fluid actuated contactor for integrated circuit semiconductor chips and other electrical components which may be used to make rapid contact to such a component for the purpose of applying ultrahigh frequency alternating current AC signals to, and receiving ultrahigh frequency AC pulses from, the component. The contactor is particularly adapted for use in testing semiconductor chips at operating speeds employed in high speed computer applications.

Advanced high speed computers require memory circuits, memory drive circuits, and logic circuits that are capable of responding in the nanosecond ($1\times10^{19}$ second) range or even the picosecond ($1\times10^{112}$ second) range. The speeds at which such circuits operate require transmission of currents having frequencies approaching and even exceeding the gigaHertz ($1\times10$ cycles per second) range. With such small response times and high frequencies involved, the extensive utilization of transmission line techniques is required in computer applications. Printed circuits are now constructed with the characteristics of transmission lines, e.g., with signal conductors placed a known preset distance from a reference ground plane to obtain a constant impedance for impedance matching to signal generators and thereby prevent signal reflections. The increased demands of such high speed operation has also necessitated the development of connectors for joining printed circuit boards which also utilize impedance matched transmission line techniques. An example of such a connector is disclosed in U.S. Pat. No. 3,401,369 to P. H. Palmateer and K. J. Roche, issued Sept. 10, 1968, and assigned to IBM.

Because computer circuitry must operate at the speeds and frequencies indicated above, it must also be tested at such speeds and frequencies before it is installed in a computer, if it is to prove reliable in actual use conditions. While the application of transmission line techniques to the permanent packaging of such circuitry has met the needs of high speed computer applications, the development of contactors for rapid, nonpermanent contact of such circuitry for test purposes has not kept pace. At the present time, there is therefore a need for a contactor which is capable of applying pulses with extremely fast rise times, such as ultrahigh frequency AC signals in the gigaHertz range to such electrical components as integrated circuit semiconductor chips and sensing the response of the components thereto, under testing conditions.

If the ultrahigh frequency AC signal also has relatively high power, the very high current densities resulting in very small integrated circuits requires cooling means to dissipate heat generated in the circuits. Adequate cooling of integrated circuits under high power test conditions has been and continues to be a problem.

Description of the Prior Art

The known technique for making contact to an integrated circuit semiconductor chip of the type described by B. Augusta, "64-Bit Planar Double Diffused Monolithic Memory Chip," 1969 IEEE International Solid-State Circuits Conference Digest of Technical Papers, is through the use of discrete cantilever contacts to each of the 23 contact pads on the chip. To approximate the impedance matching required for ultrahigh frequency signal transmission to the chip, a metallic ground plane is positioned near the cantilever contacts. This approach requires a time consuming procedure of adjusting each cantilever contact to the corresponding chip contact that requires several hours each time it is done. With such a number of cantilever contacts which must be adjusted on the basis of the integrated circuit chip geometry to contact the chip contacts properly, impedance can only be averaged and often varies between 40 and 90 ohms for a required 50 ohm impedance matched contactor. This results in considerable degradation of ultrahigh frequency signals and other signals with very rapid rise times.

It is the present practice in the AC testing of integrated circuit chips with a cantilever contactor to incorporate most of the required test circuitry in a separate unit called a "test can" linked to the contactor by coaxial cable transmission lines, and then to mount the most critical test circuitry, such as pulse shaping circuits which give signals generated in the test can a faster rise time, as close to the cantilever contactor a Even this approach allows considerable signal degradation to take place. For this reason, such a contactor has only been capable of transmitting signals in the nanosecond range and not in the picosecond range. In addition to obtaining better impedance matching in the contactor, it would be desirable to mount the most critical test circuitry directly on the contactor, as close to the semiconductor chip as possible. Ultimately, it would be advantageous to mount most of the circuitry in the test can directly on the contactor in integrated circuit form. To accomplish these ends, substantial change in the contactors now employed for the ultrahigh frequency alternating current testing of semiconductor chips is required.

Fluid actuated contactors suitable for applying direct current signals to an integrated circuit semiconductor chip are known, as disclosed, for example, in U.S. Pat. No. 3,405,361. However, these contactors are not suitable for use at ultrahigh frequencies.

Ultrahigh frequency transmission of signals to semiconductor devices under test conditions can now only be achieved through sacrifices due to delays in testing time for alignment of present contactors to the configuration of the device chip configuration under test, and further sacrifices in the quality of the signals so transmitted. Such techniques as currently exist do not prove adequate for the even higher frequency requirements of computer integrated circuit technology now under development.

Summary of the Invention

Accordingly, it is an object of this invention to provide an essentially one-piece, fluid actuated, microstrip transmission line contactor for electrical components.

It is a further object of the invention to provide a fluid actuated contactor for electrical components which does not require visual alignment of the components to make proper contact.

It is another object of the invention to provide a contactor for making temporary electrical contact to a component under test and transmit signals with rise times in the picosecond range to the component.

It is yet another object of the invention to provide a contactor for electrical components on which critical input and output circuitry to the components may be directly mounted.

It is still another object of the invention to provide a constant impedance, fluid actuated contactor for a semiconductor chip.

It is a further object of the invention to provide a self-cooled contactor suitable for applying high power, ultrahigh frequency alternating current to a semiconductor chip.

It is another object of this invention to provide a contactor for applying ultrahigh frequency AC pulses to a semiconductor chip which does not require individual adjustment of the contact members.

These and other related objects may be attained by employing the fluid actuated, impedance matched contactor herein disclosed. The contactor has a flexible dielectric membrane and a resilient, electrically conductive ground plane on one side of, and preferably bonded to, the dielectric membrane. There are a plurality of electrically conductive lines on the other side of, and also preferably bonded to, the dielectric membrane. These electrically conductive lines are adapted to contact an electrical component, such as an integrated circuit semiconductor chip. Fluid pressure applying means operatively engages the flexible dielectric membrane from the ground plane side. Typically, an air or other fluid filled chamber and a pump or other means to increase the fluid pressure is employed for this purpose. Increasing the fluid pressure will urge the electrically conductive lines carried by the dielectric membrane into contacting engagement with a semiconductor chip or other component which has been positioned next to the contactor. The ends of the electrically conductive lines which engage the electrical component have recesses or other suitable means for aligning the electrical component when positioned approximately over the ends of the electrically conductive lines.

Though its use is not limited thereto, this contactor is particularly adapted for use in testing semiconductor chips with ultrahigh frequency AC pulses and current pulses with very fast rise times of the type employed in high speed computer applications. The contactor may be impedance matched to a signal generator within an accuracy of one percent as a result of the constant impedance obtained with the ground plane separated from the electrically conductive lines by the dielectric membrane. Little or no adjustment of the contactor is required because it is of essentially unitary construction and because its fluid actuation results in substantially equal force applied to a component under test by each conducting line. Integrated circuit chips may be rapidly engaged by the contactor, subjected to the required test pulses, and disengaged. The requirements of a high volume testing operation using ultrahigh frequency test pulses may therefore be met.

A liquid coolant may be used to apply pressure to the dielectric membrane, thus enabling heat generated by high current densities to be dissipated. Circuit elements which must be mounted as close to the electrical components under test as possible may be mounted directly on the dielectric membrane itself without materially affecting the contact force of the contactor conducting lines. These advantages obtained in the subject contactor, though of most direct application to the testing of such microelectronic electrical components as integrated circuit semiconductor chips, make the contactor suited for a wide variety of other application.

The foregoing and other objects, features, and advantages of the invention will be apparent from the following more particular description of the preferred embodiments of the invention, as illustrated in the accompanying drawings.

Description of the Preferred Embodiments

Figure 1:
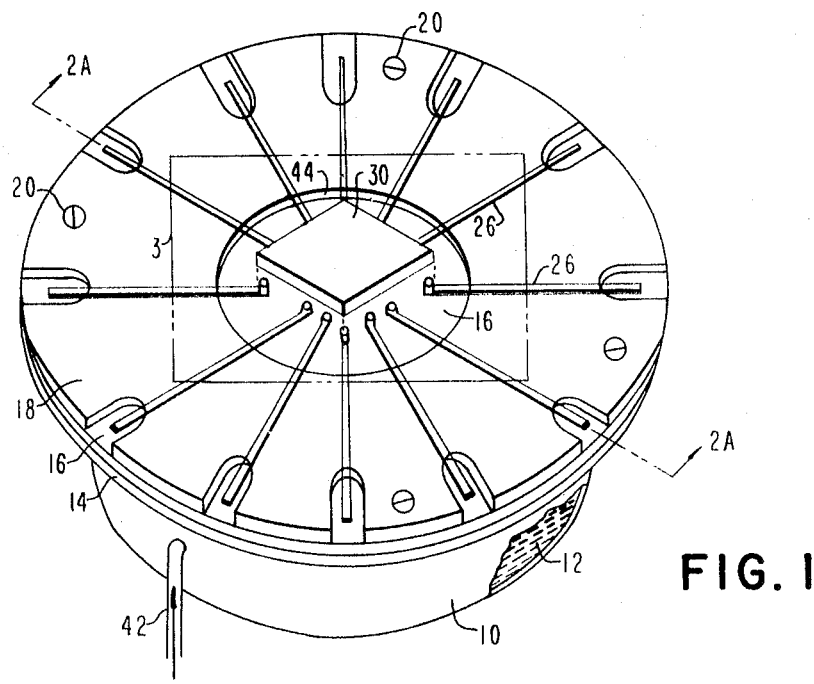
FIG. 1 is a perspective view of the claimed contactor showing an integrated circuit chip positioned for engagement by the contactor.
Figure 2A:
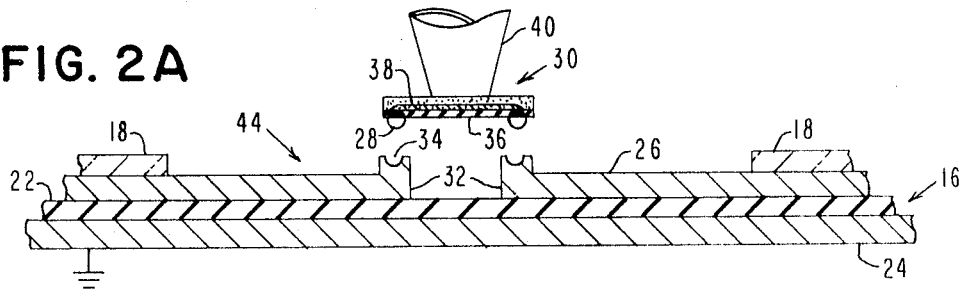
FIG. 2A is a portion of a cross section taken along the line 2A-2A in FIG. 1 and showing details of the contactor construction.

Referring now to the drawings, more particularly to FIGS. 1 and 2A, there is shown an example of the claimed contactor. A pressure chamber 10 contains a fluid 12 for actuating the contactor, such as air, fluorinated hydrocarbon or other suitable liquid coolant, or the like. Pressure chamber 10 has flange 14 on which a composite sheet 16 rests. Clear plastic plate 18 overlies sheet 16 and is fastened to flange 14 by bolts 20 or other suitable fastening means to form a fluid tight seal between sheet 16 and flange 14.

Sheet 16 contains the electrical elements of the contactor, as most clearly shown in FIG. 2A. Sheet 16 is made up of dielectric membrane 22, on one side of which, and preferably bonded thereto, is flexible ground plane 24. Ground plane 24 is copper or other suitable conducting metal. Conducting lines 26 are on the other side of dielectric membrane 22, and are also preferably bonded thereto. Conducting lines 26 are copper or other suitable conducting metal, such as gold or a silver-palladium alloy. One conducting line 26 is provided for each contact pad 28 of integrated circuit semiconductor chip 30 to be contacted, unless a Kelvin contact is desired. In that case, two conducting lines 26 for each pad 28 to which Kelvin contact is desired are provided. Terminal portions 32 of the conducting lines 26 contain recesses 34 into which contact pads 28 of chip 30 fit when the contactor engages chip 30. A silicon dioxide protective layer 36 on chip 30 prevents active area 38 of the chip from being damaged or short-circuited when the chip is engaged by the contactor.

In operation, chip 30 is held in place by a vacuum pencil 40 (shown in part only) or other suitable means, with its contact pads 28 near and approximately over recesses 34 in terminal portions 32 of conducting lines 26. Apparatus for positioning semiconductor chips over a contactor very rapidly is known in the art and is disclosed, for example in U.S. Pat. No. 3,392,830, to Broderick et al., issued July 16, 1968, and assigned to IBM. Pressure is applied to fluid 12 through line 42, causing sheet 16 to be moved upwards toward chip 30 within the area of opening 44 in plate 18, as represented by arrows 46 in FIG. 2B.

If chip 30 is only approximately positioned with its solder contact pads 28 over recesses 34, such as with a guide as disclosed in the Broderick patent, the engagement of the pads by the recesses serves to align chip 30 in proper relationship with the contactor automatically. Visual alignment of the chip with respect to conducting lines 26 is therefore not needed.

Figure 2B:
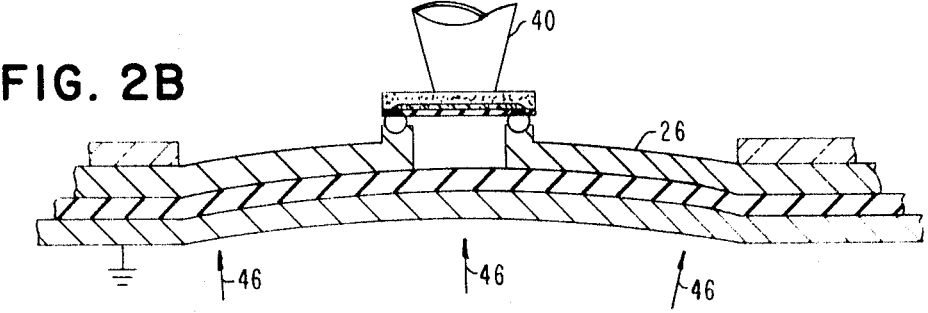
FIG. 2B is a cross section similar to FIG. 2A, but with the contactor shown in engaging relationship with a semiconductor chip.

With the chip in engaging relationship with the contactor, as shown in FIG. 2B, suitable fast rise time test pulses such as ultrahigh frequency AC test pulses may be applied to integrated circuits in chip 30, and the responses of the integrated circuits thereto may be sensed.

The combination of conducting lines 26 separated from ground plane 24 by dielectric membrane 22 is a microstrip, constant impedance transmission line. By adjustment of the thickness of dielectric membrane 22 and the size of conducting lines 26 different desired impedance levels may be obtained. In this manner, a transmission impedance through the contactor may be established within one percent of a desired level. This allows very close impedance matching to a signal generator, thus preventing signal distortion and reflection. In contrast, with a cantilever contactor, the impedance of which may only be averaged and which may vary by a factor of 40 percent or more from the desired lever, only approximate impedance matching may be obtained. Therefore, substantial degradation either in signal amplitude or frequency is obtained with the cantilever contactor, and with the fastest rise time signals, e.g., the highest frequencies, passage of the signal essentially does not occur.

As most clearly shown in FIG. 2B, when the contactor of this invention is actuated to contact a semiconductor chip 30, the conducting lines 26, dielectric membrane 22 and ground plane 24 move in unison. This means that no substantial change in the impedance of the contactor occurs when it is actuated. In the prior art cantilever contactors, the individual cantilever contacts move with respect to their ground plane when a semiconductor chip presses down on them to make contact. The result is to alter the impedance of the cantilever contacts along their length, making constant impedance transmission even more difficult.

In most instances, it has not been possible to match the impedance of a contactor to both a signal generator and to an integrated circuit chip, because the impedance the chip will vary depending on the manner in which its circuits are being driven. Since the impedance of prior art contactors also could not be controlled accurately, only the signal generator could be established at a desired impedance level. However, the fact that a constant impedance can be obtained in the contactor of this invention within very close limits now means that the impedance of both the contactor and a signal generator can be adjusted to the impedance of an integrated circuit chip when operating in its most critical circuit functions.

Dielectric membrane 22 is desirably a flexible organic material, such as polyethyleneterephthalate or polytetrafluoroethylene (obtainable from E. I. DuPont De Nemours and Company under the trademarks Mylar and Teflon respectively) having a thickness usually between about 1/2 and 20 mils (thousandths of an inch). The sheet 16 of the contactor is easily fabricated from a laminate of such a flexible dielectric membrane with a layer of copper on each side. The conducting lines 26 are formed on the top of dielectric membrane 22 by conventional photoresist and etching techniques known in the printed circuit fabrication art. A second photoresist and etching step is employed to obtain recesses 34 in the terminal portions 32 of conducting lines 26.

Figure 3:
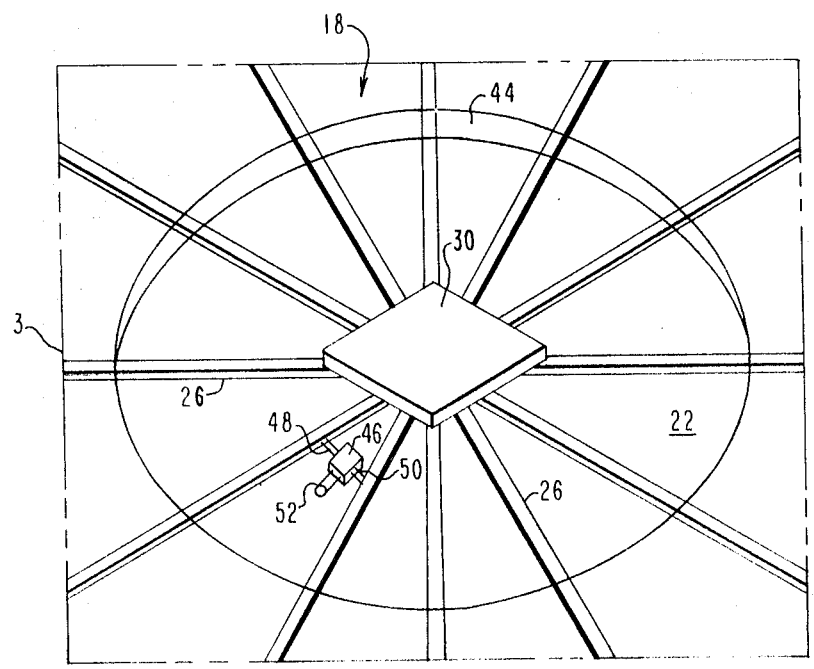
FIG. 3 is an enlarged view of a central portion of a contactor similar to FIG. 1.

A particular advantage of the present contactor is that it has a configuration which will allow critical circuit elements used with the contactor to be directly mounted on it. For example, suitable circuitry may be mounted in a module on the surface of sheet 16 beneath clear plastic plate 18 in an aperture formed for this purpose. Lines may be formed on the dielectric membrane 22 to connect the module to conducting lines 26 and, through dielectric membrane 22, to ground plane 24 as appropriate. Individual components such as capacitors or diodes may also be mounted on dielectric membrane 22 and connected to conducting lines 26 as well as through dielectric membrane 22 as appropriate. For example, FIG. 3 shows a transistor 46 mounted on the surface of dielectric membrane 22. Lines 48 and 50 serve to connect the emitter and collector of the transistor to two of the conducting lines 26. Line 52 connects the base of the transistor through dielectric membrane 22 to underlying ground plane 24.

Such circuit elements could not be directly mounted on the prior art cantilever contactors to bring them as close to semiconductor chip 30 because components interconnecting some of the individual cantilever contacts would give them a different spring force against a semiconductor chip contacting them than the spring force of cantilever contacts not so interconnected. Such an arrangement would produce improper contact to some of the contact pads on the semiconductor chip being tested.

In the contactor of the present invention, the unitary construction of the conducting lines 26, flexible dielectric membrane 22, and resilient ground plane 24 overcomes the above problem. Circuit elements such as transistors or integrated circuit chips may be mounted directly on the dielectric membrane 22 without materially altering its flexibility or the contact forces applied to semiconductor chip 30 by conducting lines 26. The ability to mount critical circuit elements on the conductor means that the input pulses applied from suitable input circuitry (not shown) connected to the ends of some of the conducting lines 26 may be modified just before reaching chip 30, resulting in better signals at the end of other ones of the conducting lines 26 for detection by suitable sense circuitry connected thereto (not shown).

Figure 5:
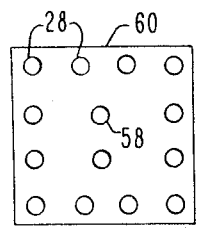
FIG. 5 is view of a contact side of a semiconductor chip of the type to be contacted by the embodiment of the contactor shown in FIG. 4.
Figure 4:
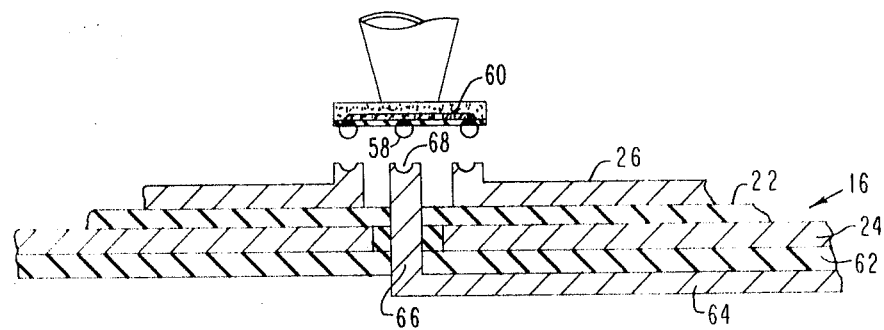
FIG. 4 is a cross section similar to FIG. 2A, but of a contactor adapted to engage a semiconductor chip with contacts on the interior of the chip surface.

A major factor requiring the contact pads 28 of an integrated circuit semiconductor chip to be positioned at the periphery of the chip surface has been the inability to provide a contactor for a semiconductor chip 60 having contacting pads 58 disposed within the interior surface thereof as shown in FIG. 5. The contactor of this invention may be constructed as shown in the cross section view of FIG. to contact such pads 58. The sheet 16 of the modified contactor has ground plane 24 and conducting lines 26 on either side of flexible dielectric membrane 22, as previously. To the surface of ground plane 24 opposite from flexible dielectric membrane 22 is bonded a second flexible dielectric membrane 62. To second flexible dielectric membrane 62 is bonded a conducting line 64 having terminal portion 66 passing through the second dielectric membrane, the ground plane 24, (and insulated therefrom), and the first dielectric membrane 22. The terminal portion 66 of conducting line 64 has a recess 68 in its end to engage contact pad 58 of chip 60. This modified form of the contactor therefore enables a previous design constraint on integrated circuit semiconductor chips i.e., that contact pads could only be arranged around the periphery of the chip, to be eliminated.

It should be apparent that a contactor for electrical components, particularly integrated circuit semiconductor chips, capable of obtaining the stated objects has been provided. Impedance matched, microstrip transmission line techniques capable of providing ultrahigh frequency AC signals in the gigaHertz range and signals having rise times in the picosecond range at a component have been provided in a contactor suitable for nonpermanent contact, as in testing. The contactor is of essentially unitary construction and automatically aligns a component positioned approximately over its contacts. The contactor is therefore capable of meeting the demands of the most sophisticated ultrahigh frequency AC and fast rise time testing of semiconductor chips under high volume testing conditions. Most significantly, these advantages have been obtained in a contactor that is very inexpensively and quickly fabricated.

Although the above discussion has been in terms of contacting semiconductor chips, with suitable indexing means, the contactor would be used to contact integrated circuits in an array on a wafer prior to dicing into chips.

While the invention has been particularly shown and described with reference to preferred embodiments thereof, it will be understood by those skilled in the art that various changes in form and details may be made therein without departing from the spirit and scope of the invention.

What we claim is:
1. A contactor for an electrical component comprising:
   a. a flexible dielectric membrane,
   b. a plurality of electrically conductive lines on one side of said dielectric membrane and adapted to contact said electrical component,
   c. a resilient, electrically conductive ground plane on the other side of said dielectric membrane, formed to move with said membrane and covering the ground plane side of said membrane along said electrically conductive lines, and
   d. fluid pressure-applying means operatively engaging said flexible dielectric membrane from the ground plane side to urge said electrically conductive lines into contacting engagement with said electrical component.
2. The contactor of claim 1 in which said fluid pressure-applying means comprises air and means for increasing the pressure of the air.
3. The contactor of claim 1 in which said fluid pressure-applying means comprises a liquid coolant and means for applying pressure to the coolant.
4. The conductor of claim 1 additionally comprising:
   e. at least one circuit element mounted on said flexible dielectric membrane and electrically connected to at least one of said plurality of electrically conductive lines.
5. A contactor for a semiconductor chip comprising:
   a. a pressure chamber having a cover comprising:
      1. a flexible dielectric membrane,
      2. a resilient, electrically conductive ground plane disposed on said dielectric membrane inside said chamber, formed to move with said membrane and covering the entire ground plane side of said membrane at a region of the contactor in which said semiconductor chip is contacted, and
      3. a plurality of electrically conductive lines disposed on said dielectric membrane outside said chamber and adapted to contact said semiconductor chip,
   b. a fluid in said pressure chamber, and c. means for increasing the pressure of said fluid to move said electrically conductive lines on said dielectric membrane into contacting engagement with said semiconductor chip.

6. The contactor of claim 5 in which said fluid is air.

7. The contactor of claim 5 in which the fluid is a liquid coolant.

8. The contactor of claim 5 additionally comprising:
g. at least one circuit element mounted on the flexible dielectric membrane and electrically connected to at least one of the plurality of electrically conductive lines.

9. A contactor for a semiconductor chip having a plurality of contact pads comprising:
a. a flexible dielectric membrane,
b. a resilient, electrically conductive ground plane on one side of said dielectric membrane,
c. a plurality of electrically conductive lines on the other side of said dielectric membrane and having recesses at end portions of at least some of said plurality of electrically conductive lines into which said contact pads may rest for automatically positioning said semiconductor chip in contacting relationship with at least some of said plurality of electrically conductive lines, and
d. fluid pressure-applying means operatively engaging said flexible dielectric membrane from the ground plane side to urge said electrically conductive lines into contacting engagement with said contact pads.

10. A contactor for an electrical component comprising:
a. a flexible dielectric membrane,
b. a resilient, electrically conductive ground plane on one side of said dielectric membrane,
c. a plurality of electrically conductive lines on the other side of said dielectric membrane and adapted to contact said electrical component,
d. fluid pressure-applying means operatively engaging said flexible dielectric membrane from the ground plane side to urge said electrically conductive lines into contacting engagement with said electrical component, and
e. at least one semiconductor chip mounted on said flexible dielectric membrane and electrically connected to at least one of said plurality of electrically conductive lines.

11. A contactor for an electrical component comprising:
a. a first flexible dielectric membrane,
b. a resilient, electrically conductive ground plane on one side of said dielectric membrane,
c. a plurality of electrically conductive lines on the other side of said dielectric membrane and adapted to contact said electrical component,
d. fluid pressure-applying means operatively engaging said flexible dielectric membrane from the ground plane side to urge said electrically conductive lines into contacting engagement with said electrical component,
e. a second flexible dielectric membrane on the other side of said ground plane from said first flexible dielectric membrane, and
f. an electrically conductive line on the other side of said second flexible dielectric membrane from said ground plane and having a terminal portion passing through said second flexible dielectric membrane, said ground plane and said first flexible dielectric membrane, the terminal portion being adapted to engage said electrical component.

12. A contactor for a semiconductor chip having a plurality of contact pads comprising:
a. a pressure chamber having a cover comprising:
1. a flexible dielectric membrane,
2. a resilient electrically conductive ground plane disposed on said dielectric membrane inside said chamber, and
3. a plurality of electrically conductive lines disposed on said dielectric membrane outside said chamber and having recesses at their end portions into which said contact pads may rest, for automatically positioning said semiconductor chip with its contact pads in engaging relationship with at least some of the plurality of electrically conductive lines,
b. a fluid in said pressure chamber, and
c. means for increasing the pressure of said fluid to move said electrically conductive lines on said dielectric membrane into contacting engagement with said semiconductor chip.

PO-1050
(5/69)

UNITED STATES PATENT OFFICE
CERTIFICATE OF CORRECTION

Patent No. 3,596,228     Dated July 27, 1971

Inventor(s) Frank W. Reed, Jr. and William J. Ryan

It is certified that error appears in the above-identified patent and that said Letters Patent are hereby corrected as shown below:

Column 6, Line 59, delete "conductor" and substitute therefor -- contactor --.

Signed and sealed this 8th day of August 1972.

(SEAL)
Attest:

EDWARD M. FLETCHER, JR.
Attesting Officer

ROBERT GOTTSCHALK
Commissioner of Patents